United States Patent
Ha et al.

(10) Patent No.: US 7,027,778 B2
(45) Date of Patent: Apr. 11, 2006

(54) RADIO FREQUENCY SWITCHING APPARATUS AND MOBILE TELECOMMUNICATION TERMINAL USING THE SAME

(75) Inventors: Jong Soo Ha, Kyungki-do (KR); Yong Ju Ban, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 414 days.

(21) Appl. No.: 10/456,491

(22) Filed: Jun. 9, 2003

(65) Prior Publication Data

US 2004/0185818 A1    Sep. 23, 2004

(30) Foreign Application Priority Data

Mar. 21, 2003    (KR) .................. 10-2003-0017807

(51) Int. Cl.
    H04B 1/44    (2006.01)
(52) U.S. Cl. .................. 455/78; 455/80; 455/79; 455/83; 333/110
(58) Field of Classification Search .................. 455/78, 455/79, 80, 82, 83, 81, 334, 339, 131; 333/175, 333/177, 178, 110, 173
    See application file for complete search history.

(56) References Cited

U.S. PATENT DOCUMENTS

| | | | | |
|---|---|---|---|---|
| 4,970,479 A | * | 11/1990 | Landt et al. | 455/78 |
| 4,973,940 A | * | 11/1990 | Sakai et al. | 455/80 |
| 5,355,524 A | * | 10/1994 | Higgins, Jr. | 455/82 |
| 5,434,455 A | * | 7/1995 | Kammeter | 333/177 |
| 5,497,417 A | * | 3/1996 | Brahms et al. | 333/175 |
| 5,625,894 A | * | 4/1997 | Jou | 455/78 |
| 2002/0177421 A1 | * | 11/2002 | Muhammad et al. | 455/131 |
| 2004/0185818 A1 | * | 9/2004 | Ha et al. | 455/334 |

FOREIGN PATENT DOCUMENTS

| | | | |
|---|---|---|---|
| JP | 07-079173 | * | 3/1995 |
| JP | 2004-140597 | | 5/2004 |
| JP | 2004-172729 | | 6/2004 |

OTHER PUBLICATIONS

Japanese Abstract, Patent No. JP7079173, Published Mar. 20, 1995.

* cited by examiner

*Primary Examiner*—Lana Le
(74) *Attorney, Agent, or Firm*—Lowe Hauptman & Berner, LLP

(57) ABSTRACT

A radio frequency switching apparatus wherein a filter for a transmitter module passes a transmission frequency to an antenna in a transmission mode and isolates the antenna and the transmitter module from each other in a reception mode. The radio frequency switching apparatus comprises a filter connected between the transmitter module and the antenna for passing a transmitted signal from the transmitter module to the antenna in the transmission mode. The filter also acts to cut off a reception frequency in the reception mode. The switching apparatus further comprises a first switching device for isolating the transmitter module and the antenna from each other in the reception mode, and a second switching device for isolating the antenna and a receiver module from each other in the transmission mode. No separate ¼ wavelength strip line is required, making the circuitry of the switching apparatus simpler and, thus, the size thereof smaller.

9 Claims, 11 Drawing Sheets

RADIO FREQUENCY SWITCHING APPARATUS AND MOBILE TELECOMMUNICATION TERMINAL USING THE SAME

BACKGROUND OF THE INVENTION

1. Field of the Invention

The present invention relates to a radio frequency switching apparatus applied to a mobile telecommunication terminal such as a GSM (Global System for Mobile Communication) terminal, a DCS (Digital Communication Services) terminal, a PCS (Personal Communication Services) terminal or etc., and more particularly to a radio frequency switching apparatus wherein a filter for a transmitter module passes a transmission frequency to an antenna in a transmit (Tx) mode and functions as a ¼ wavelength impedance transformer in a receive(Rx) mode to isolate the antenna and the transmitter module from each other in an alternating current (AC) manner, so that no separate ¼ wavelength strip line is required while performances, such as a loss characteristic of a receiver module, and an isolation characteristic of the transmitter module are satisfied, thereby making the circuitry of the switching apparatus simpler and, thus, the size thereof smaller, and a mobile telecommunication terminal using the same.

2. Description of the Related Art

Generally, mobile telecommunication terminals have a variety of functions and the sizes and designs thereof are greatly taken into account. In this regard, radio frequency (RF) associated components, such as an RF switch, etc., have to meet demands for miniaturization, modularization and multifunctionalization.

FIG. 1 illustrates an operational conception of a general RF switch which is applied to a digital mobile phone or etc. As shown in this drawing, the RF switch is connected in common to an antenna ANT, transmitter module TX and receiver module RX to switch over the connection of the transmitter module TX to the antenna ANT and the connection of the receiver module RX to the antenna ANT to each other. The transmitter module TX generally includes a low pass filter (LPF) connected to the antenna ANT, and a transmitter circuit TX' connected to the LPF.

One example of such conventional RF switches is disclosed in Japanese Patent Laid-open Publication No. Heisei 07-79173. This conventional RF switch will hereinafter be described with reference to FIG. 2 along with an LPF disclosed in the same publication.

FIG. 2 is a circuit diagram of the above-mentioned conventional RF switch. As shown in this drawing, the conventional RF switch, denoted by the reference numeral 11, includes a first diode 4a having its anode connected to a transmitter circuit TX' and its cathode connected to an antenna ANT, a first strip line 5a connected between the anode of the first diode 4a and a ground terminal, a second strip line 5b connected between the antenna ANT and a receiver module RX, a second diode 4b having its anode connected between the second strip line 5b and the receiver module RX and its cathode connected to the ground terminal, and a third strip line 5c connected between a connection point of the second strip line 5b and second diode 4b and the receiver module RX.

An LPF is connected between the transmitter circuit TX' and the RF switch 11 to pass a transmitted signal from the transmitter circuit TX' to the antenna ANT.

In the RF switch 11, the first strip line 5a and the second strip line 5b each have a length set to ¼ of the wavelength λ of a transmission frequency, and the sum of the lengths of the second strip line 5b and third strip line 5c is set to ¼ of the wavelength λ of a reception frequency.

In the conventional RF switch with the above-described construction, in a transmit(Tx) mode under the condition that the reception frequency is lower than the transmission frequency, voltage levels at control terminals 6a and 6b become higher than or equal to turn-on voltage levels, so the second diode 4b is turned on, thereby causing the connection point of the second strip line 5b and third strip line 5c to be grounded. At this time, the third strip line 5c is equivalently isolated from a transmission line so as to have no effect on the transmitter circuit TX', resulting in impedance matching with the transmitter circuit TX'. In a receive(Rx) mode under the same condition, the second diode 4b is turned off, so the second strip line 5b and the third strip line 5c are connected in series. As a result, the second strip line 5b and the third strip line 5c are impedance-matched with the receiver module RX because the sum of the lengths thereof is set to ¼ of the wavelength λ of the reception frequency.

Note that a strip line having a length set to ¼ of the wavelength λ of the transmission frequency must be provided in the conventional RF switch in association with the receiver module for the switching between transmission and reception by the RF switch. For example, assuming that the transmission frequency is 1 GHz, the wavelength λ thereof is about 30[cm], as can be obtained from the following equation 1:

$$\text{Wavelength } (\lambda) = \text{luminous flux} (c) / \text{frequency} (f) \quad \text{[Equation 1]}$$
$$= 3 * 10^8 \text{ [M]}/1 \text{ GHz}$$
$$= 3 * 10^{10} \text{ [cm]}/1 * 10^9$$
$$= 30/1 \text{ [cm]} = 30 \text{ cm}$$

Accordingly, the value of ¼ of the wavelength λ of the transmission frequency 1 GHz corresponds to a length of 7.5 (30/4=7.5) [cm]. In order to implement an inductor having that length as a strip line, it is necessary to form substrates with patterns of certain lengths in a multilayered manner and electrically connect the patterns of the multilayered substrates with one another.

However, in the case where the RF switch is made in the form of a module, the ¼ wavelength strip line substantially occupies a large volume on the RF switch module, corresponding to about ⅓ of the entire volume of the switch module. For this reason, the RF switch, which essentially includes the ¼ wavelength strip line, is increased in size and complicated in construction, leading to a limitation in miniaturizing the RF switch.

Particularly, in the case where the RF switch is made in the form of one module, including the LPF which passes the transmission frequency to the antenna, it is still more increased in size.

SUMMARY OF THE INVENTION

Therefore, the present invention has been made in view of the above problems, and it is an object of the present invention to provide an RF switching apparatus wherein a filter for a transmitter module passes a transmission frequency to an antenna in a transmit(Tx) mode and functions as a ¼ wavelength impedance transformer in a receive(Rx)

mode to isolate the antenna and the transmitter module from each other in an AC manner, and a mobile telecommunication terminal using the same.

It is another object of the present invention to provide an RF switching apparatus wherein no separate ¼ wavelength strip line is required while performances, such as a loss characteristic of a receiver module, an isolation characteristic of a transmitter module, etc., are satisfied, thereby making the circuitry of the switching apparatus simpler and, thus, the size thereof smaller, and a mobile telecommunication terminal using the same.

In accordance with one aspect of the present invention, the above and other objects can be accomplished by the provision of a radio frequency switching apparatus for controlling a connection between an antenna and a transmitter module and a connection between the antenna and a receiver module, the antenna transmitting and receiving radio frequency signals, the apparatus comprising filtering means connected between the transmitter module and the antenna for passing a transmitted signal from the transmitter module to the antenna in a transmit(Tx) mode, the filtering means having an electrical length corresponding to about ¼ of a wavelength of a reception frequency in a receive(Rx) mode; first switching means connected between the filtering means and the transmitter module for connecting a connection point of the filtering means and transmitter module to a ground terminal in response to a switching signal in the receive(Rx) mode such that the filtering means is operated as an impedance transformer to isolate the transmitter module and the antenna from each other in an alternating current (AC) manner; and second switching means connected between the antenna and the receiver module for isolating the antenna and the receiver module from each other in response to the switching signal in the transmit(Tx) mode.

Preferably, if the connection point of the filtering means and transmitter module is connected to the ground terminal by the first switching means in the receive(Rx) mode, the filtering means may be operated as an impedance transformer with a phase difference of about 90° to isolate the transmitter module and the antenna from each other in the AC manner.

In accordance with another aspect of the present invention, there is provided a mobile telecommunication terminal comprising the above-described radio frequency switching apparatus.

BRIEF DESCRIPTION OF THE DRAWINGS

The above and other objects, features and other advantages of the present invention will be more clearly understood from the following detailed description taken in conjunction with the accompanying drawings, in which:

FIG. 5b is a graph illustrating frequency characteristics of the low pass filter of FIG. 5a;

FIG. 6b is a graph illustrating frequency characteristics of the low pass filter of FIG. 6a;

DESCRIPTION OF THE PREFERRED EMBODIMENTS

Figure 1:
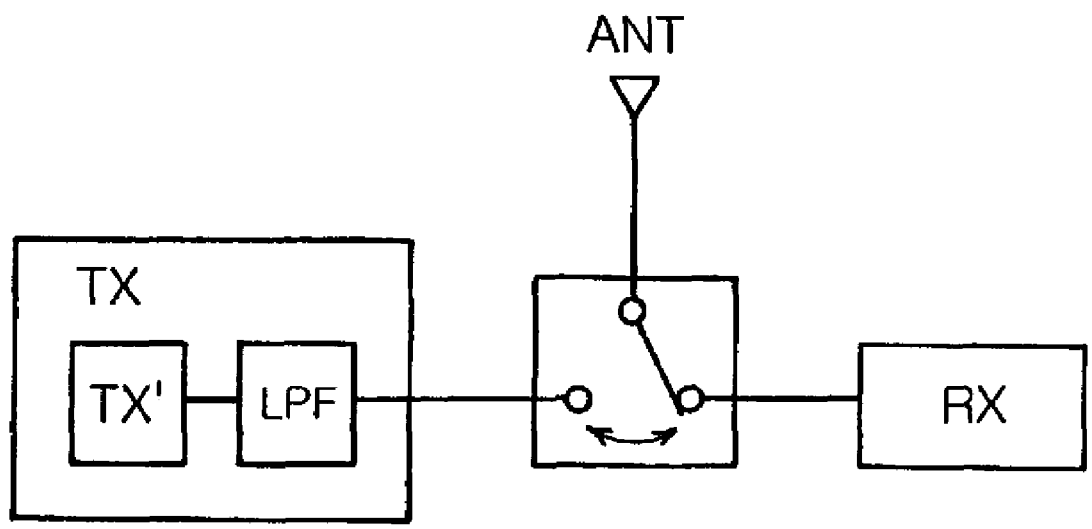
FIG. 1 is a view illustrating an operational conception of a general RF switch.
Figure 2:
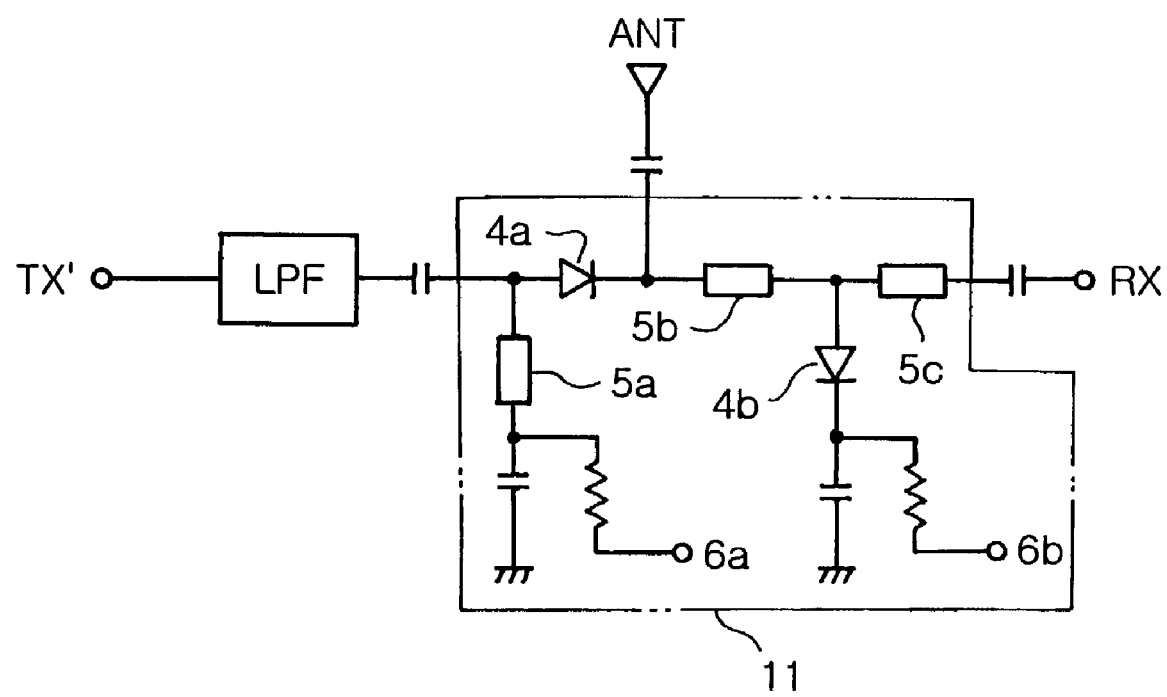
FIG. 2 is a circuit diagram of a conventional RF switch.
Figure 3:
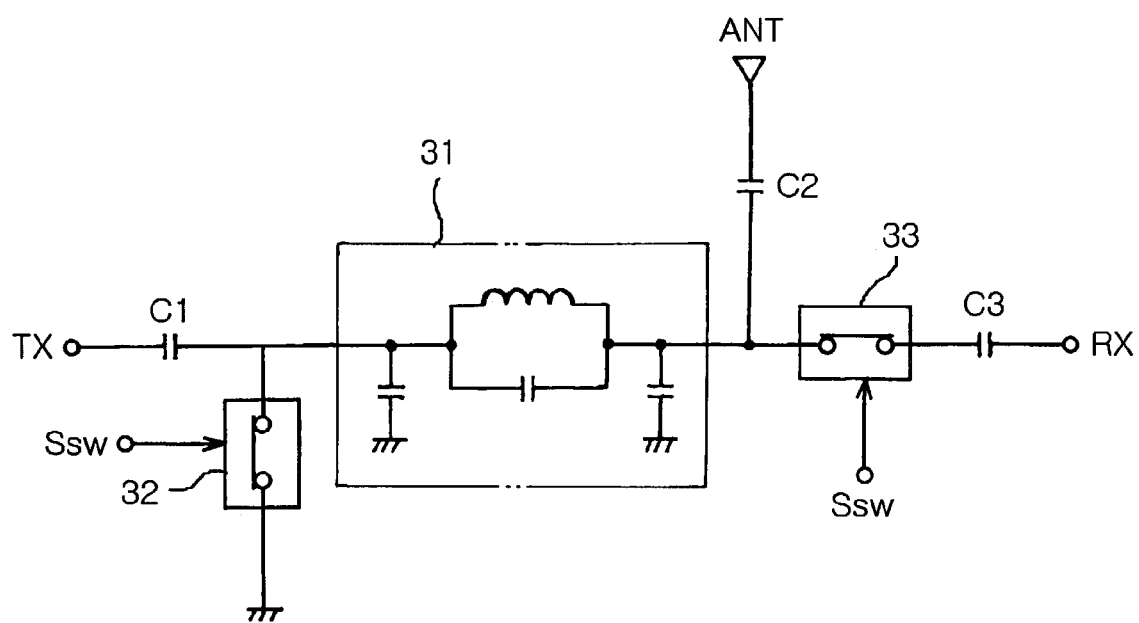
FIG. 3 is a circuit diagram of an RF switching apparatus in accordance with the present invention.

FIG. 3 is a circuit diagram of an RF switching apparatus in accordance with the present invention.

With reference to FIG. 3, the RF switching apparatus according to the present invention is adapted to control the connection between an antenna ANT, which transmits and receives RF signals, and a transmitter module TX and the connection between the antenna ANT and a receiver module RX. To this end, the RF switching apparatus comprises a filter 31 connected between the transmitter module TX and the antenna ANT for passing a transmitted signal from the transmitter module TX to the antenna ANT in a transmit(Tx) mode. The filter 31 also has an electrical length corresponding to about ¼ of the wavelength of a reception frequency in a receive(Rx) mode. The RF switching apparatus further comprises a first switching device 32 connected between the filter 31 and the transmitter module TX for connecting a connection point of the filter 31 and transmitter module TX to a ground terminal in response to a switching signal Ssw in the receive(Rx) mode such that the filter 31 is operated as an impedance transformer to isolate the transmitter module TX and the antenna ANT from each other in an AC manner, and a second switching device 33 connected between the antenna ANT and the receiver module RX for isolating the antenna ANT and the receiver module RX from each other in response to the switching signal Ssw in the transmit(Tx) mode.

If the connection point of the filter 31 and transmitter module TX is connected to the ground terminal by the first switching device 32 in the receive(Rx) mode, then the filter 31 is operated as an impedance transformer with a certain phase difference within the range of 80 to 100° to isolate the transmitter module TX and the antenna ANT from each other in the AC manner. It should be noted here that, where the phase difference is beyond the above range, the impedance between the transmitter module TX and the antenna ANT becomes low in the receive(Rx) mode, thereby making it impossible for the filter 31 to faithfully perform the AC-based isolation between the transmitter module TX and the antenna ANT. In this regard, it is preferred that the filter 31 is operated as an impedance transformer with a phase difference of about 90° in the receive(Rx) mode in order to most faithfully perform the AC-based isolation between the transmitter module TX and the antenna ANT.

The filter 31 is preferably an LPF for passing low-frequency components of the transmitted signal from the transmitter module TX in the transmit(Tx) mode. The LPF preferably has at least one attenuation pole which is formed at at least one harmonic of a transmission frequency in the transmit(Tx) mode to cut off high-power harmonic components of the transmitted signal such that they are not provided to the antenna.

Here, the reference numerals C1–C3, not described, denote coupling capacitors.

Figure 4A:
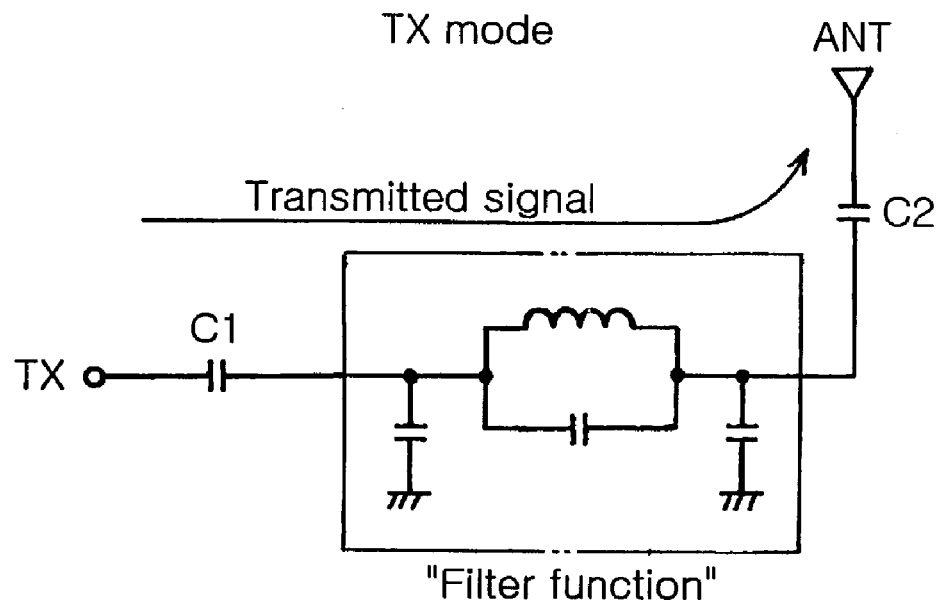
FIGS. 4a and 4b are equivalent circuit diagrams of the RF switching apparatus of FIG. 3.
Figure 4B:
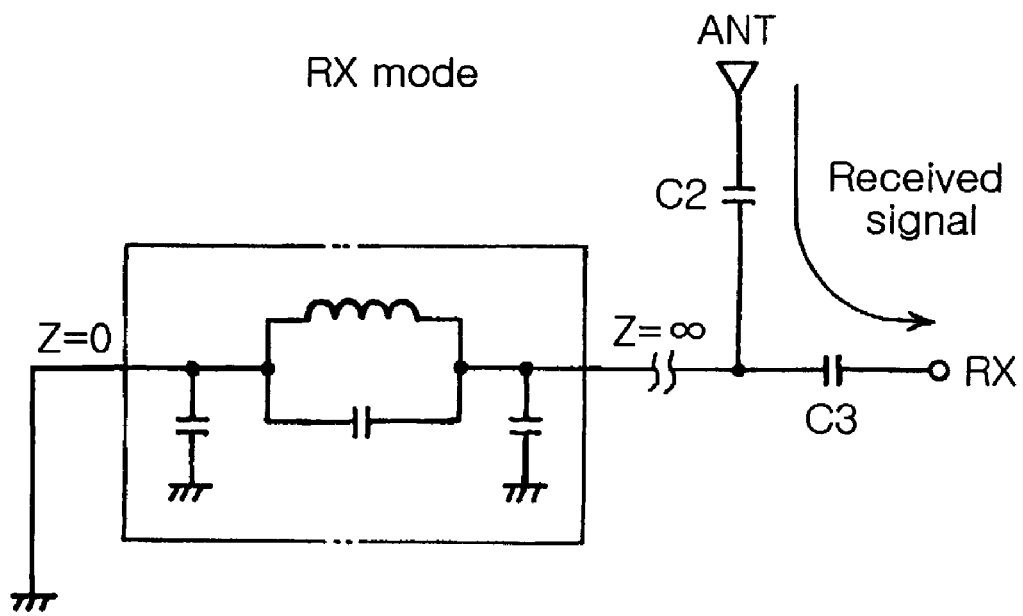

FIGS. 4a and 4b are equivalent circuit diagrams of the RF switching apparatus of FIG. 3, wherein FIG. 4a shows an equivalent circuit in the transmit(Tx) mode and FIG. 4b shows an equivalent circuit in the receive(Rx) mode.

Figure 5A:
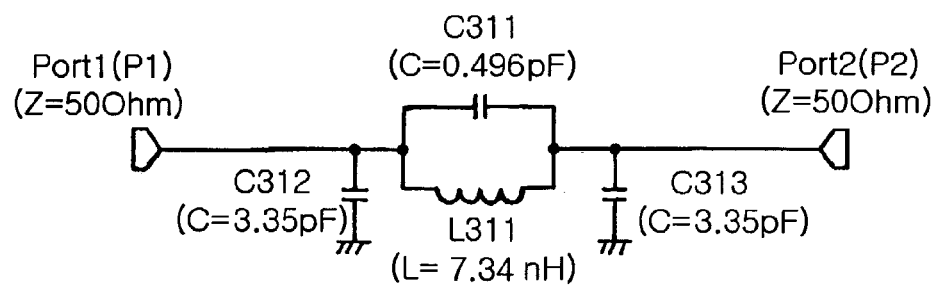
FIG. 5a is a circuit diagram of a low pass filter applied to a GSM mode.
Figure 5B:
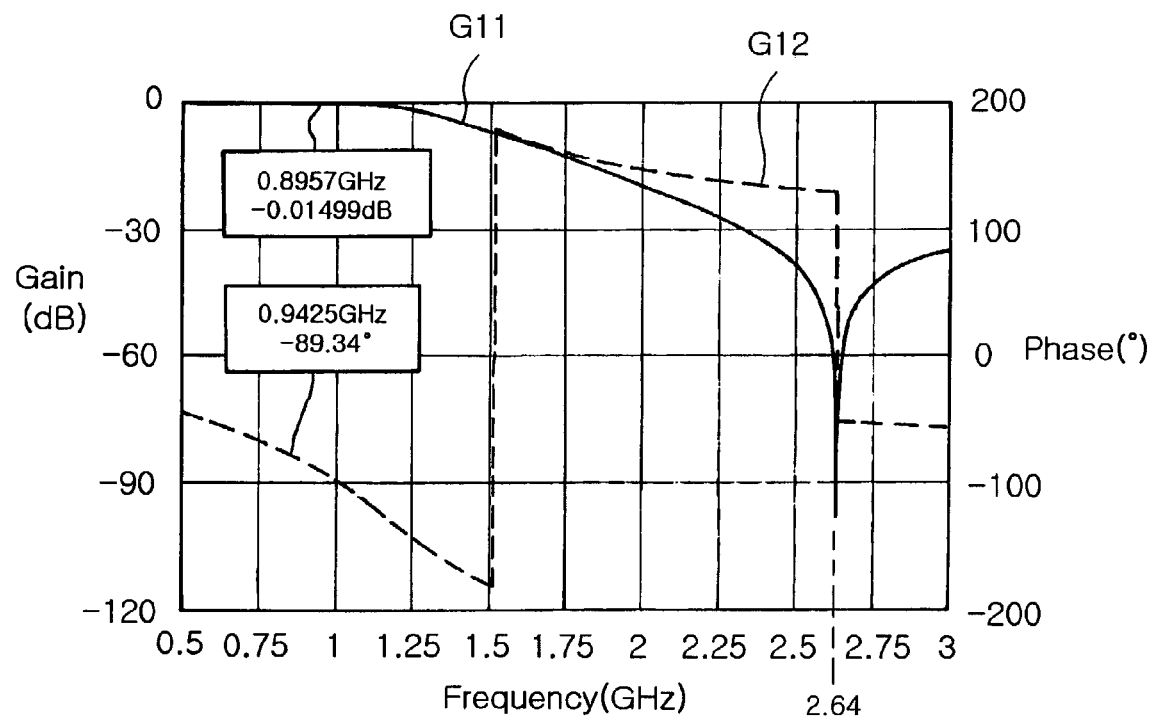
Figure 6A:
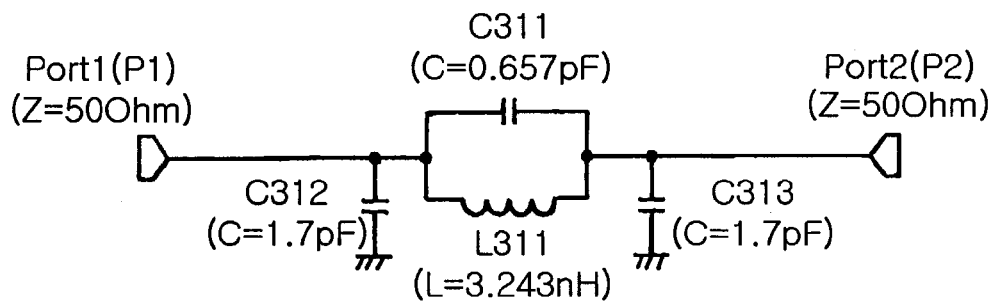
FIG. 6a is a circuit diagram of a low pass filter applied to a DCS mode.
Figure 6B:
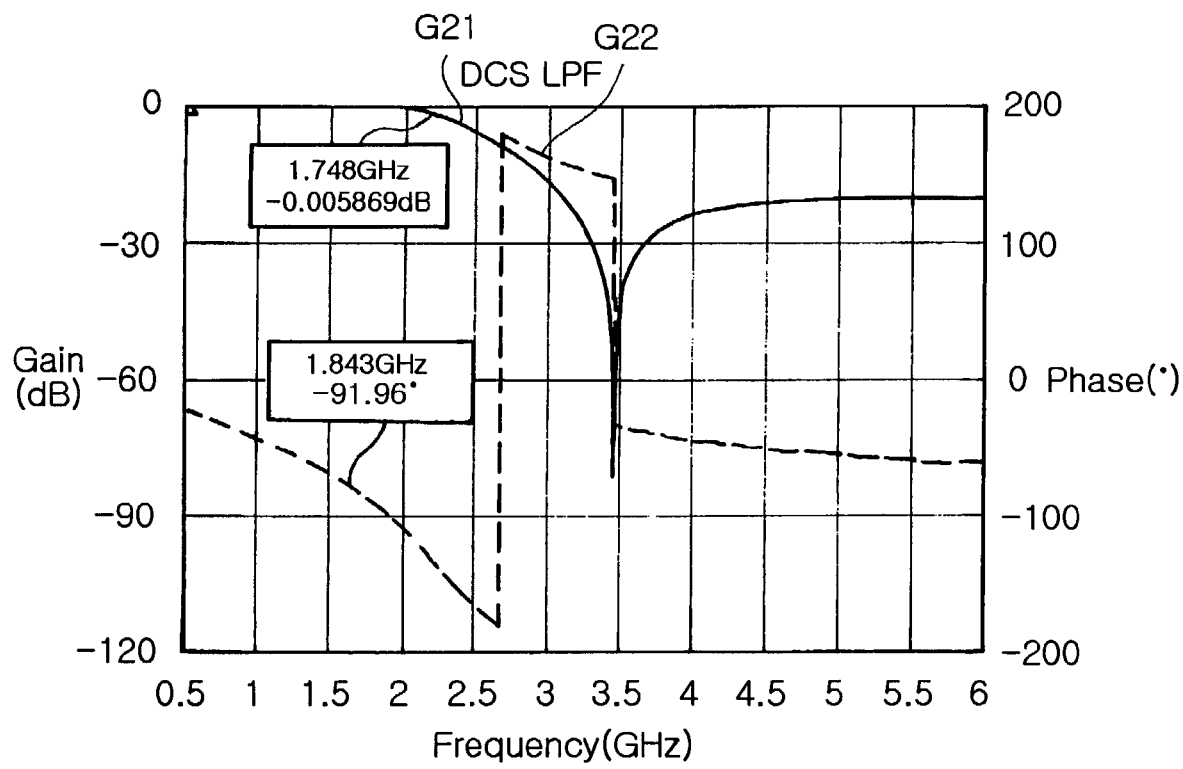

FIG. 5a is a circuit diagram of a low pass filter applied to a GSM mode and FIG. 5b is a graph illustrating frequency characteristics of the low pass filter of FIG. 5a. FIG. 6a is a circuit diagram of a low pass filter applied to a DCS mode and FIG. 6b is a graph illustrating frequency characteristics of the low pass filter of FIG. 6a.

Figure 7:
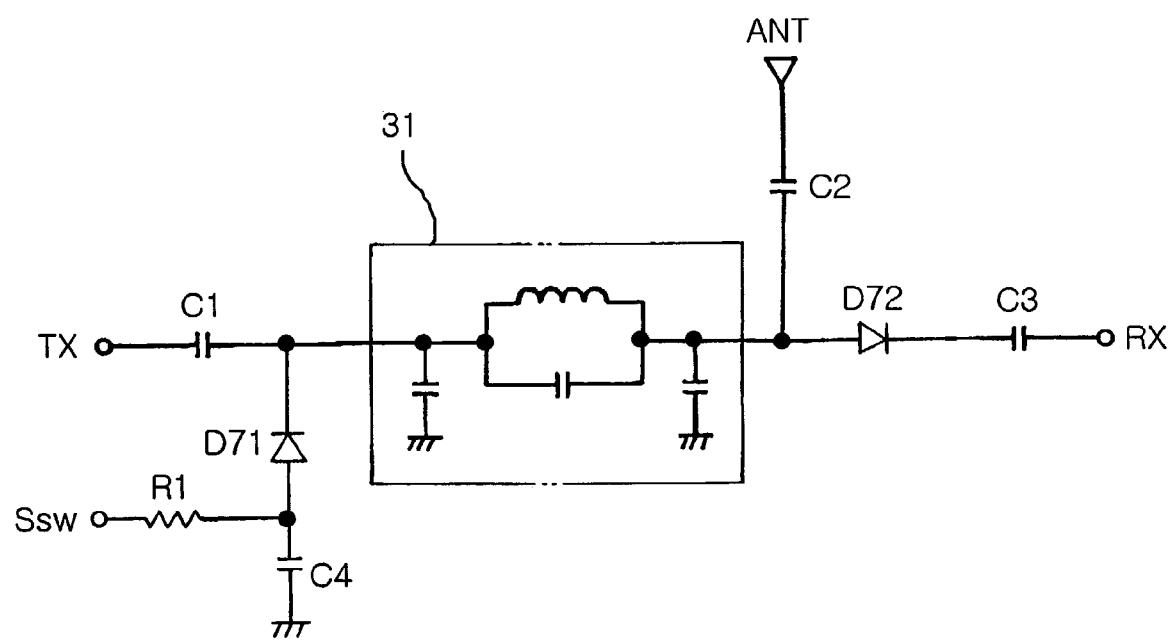
FIG. 7 is a detailed circuit diagram of a first embodiment of the RF switching apparatus of FIG. 3.

FIG. 7 is a detailed circuit diagram of a first embodiment of the RF switching apparatus of FIG. 3.

With reference to FIG. 7, the first switching device 32 is provided with a first diode D71 having its cathode connected to the connection point of the filter 31 and transmitter module TX and its anode connected in common to the ground terminal and switching signal Ssw. The second switching device 33 is provided with a second diode D72 having its anode connected to the antenna ANT and its cathode connected to the receiver module RX. Here, the reference numerals C1–C3, not described, denote coupling capacitors, R1 denotes a bias resistor and C4 denotes an AC grounding capacitor.

Figure 8:
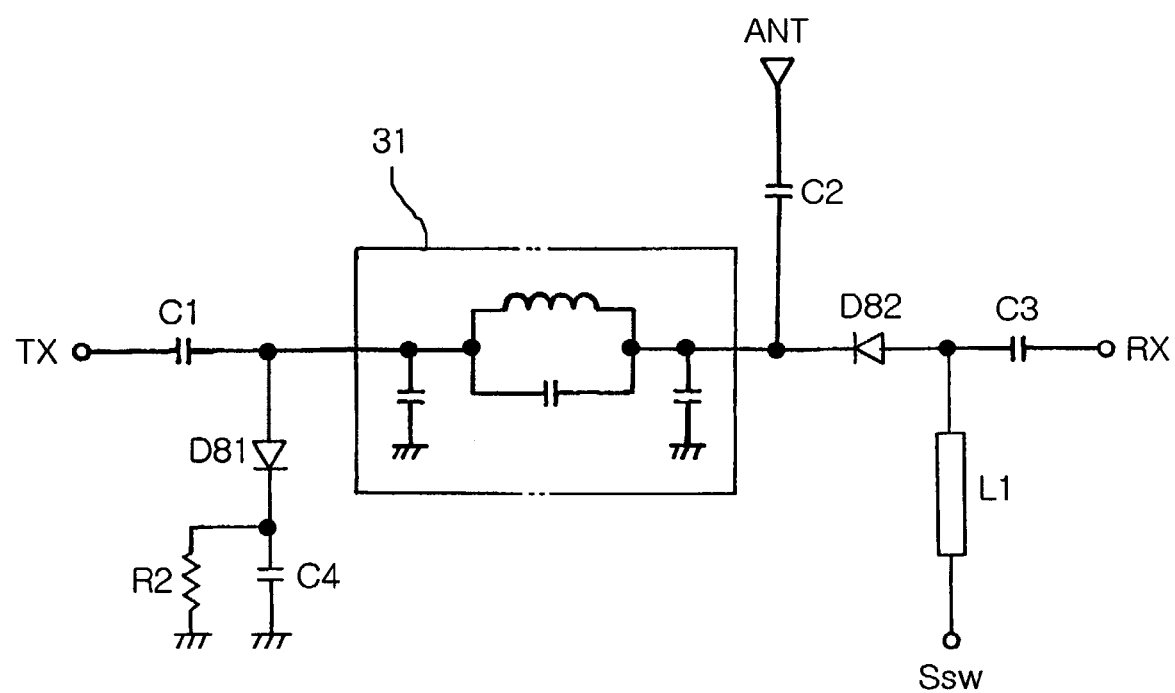
FIG. 8 is a detailed circuit diagram of a second embodiment of the RF switching apparatus of FIG. 3.

FIG. 8 is a detailed circuit diagram of a second embodiment of the RF switching apparatus of FIG. 3.

With reference to FIG. 8, the first switching device 32 is provided with a first diode D81 having its anode connected to the connection point of the filter 31 and transmitter module TX and its cathode connected to the ground terminal. The second switching device 33 is provided with a second diode D82 having its cathode connected to the antenna ANT and its anode connected in common to the receiver module RX and switching signal Ssw. Here, the reference numerals C1–C3, not described, denote coupling capacitors, R2 denotes a bias resistor, C4 denotes an AC grounding capacitor and L1 denotes an inductor for removal of AC components of the switching signal Ssw.

Figure 9:
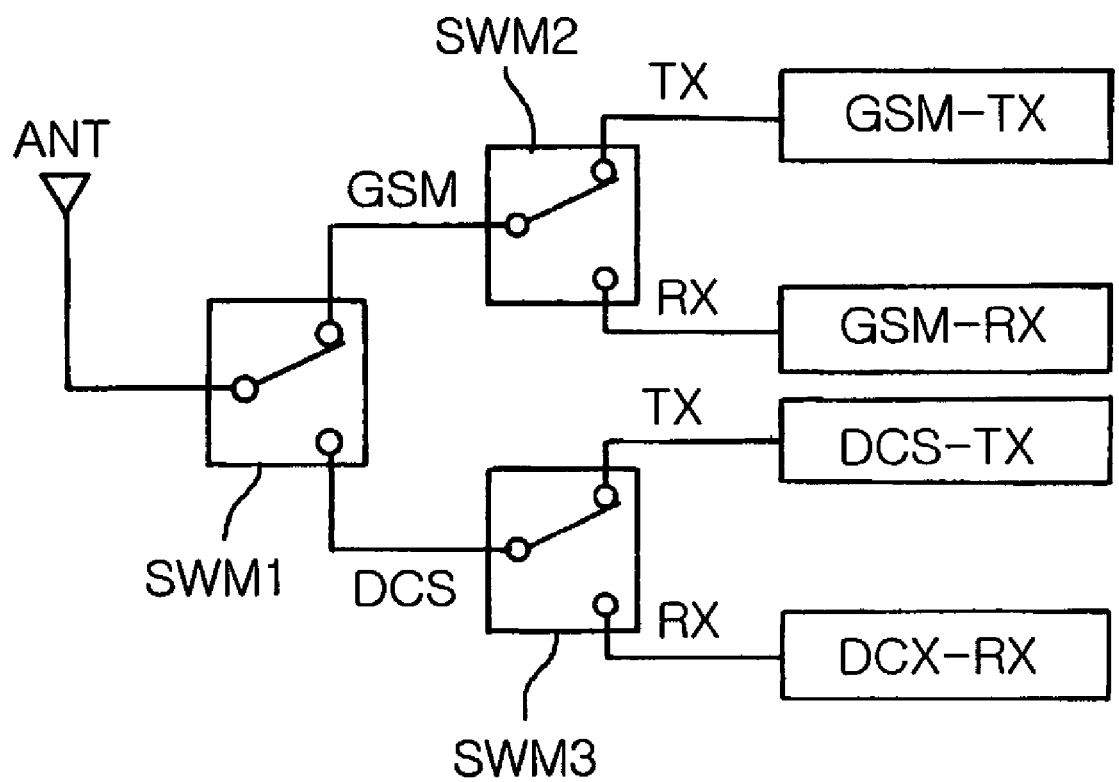
FIG. 9 is a view showing the construction of a mobile telecommunication terminal in accordance with the present invention.

FIG. 9 shows the construction of a mobile telecommunication terminal in accordance with the present invention.

The mobile telecommunication terminal shown in FIG. 9 comprises the above-described RF switching apparatus according to the present invention.

The mobile telecommunication terminal according to the present invention is shown in FIG. 9 to be applied to the GSM and DCS modes among the GSM, DCS and PCS modes for illustrative purposes. As shown in FIG. 9, the mobile telecommunication terminal comprises a pre-switching module SWM1 connected to the antenna ANT for switching it to a desired one of the GSM mode and DCS mode, a GSM switching module SWM2 connected to the pre-switching module SWM1 for switching the GSM mode to a desired one of the transmit(Tx) mode (TX mode) and receive(Rx) mode (RX mode), and a DCS switching module SWM3 connected to the pre-switching module SWM1 for switching the DCS mode to a desired one of the TX mode and RX mode. Note that at least one of the pre-switching module SWM1, GSM switching module SWM2 and DCS switching module SWM3 can be implemented with the RF switching apparatus according to the present invention.

Figure 10A:
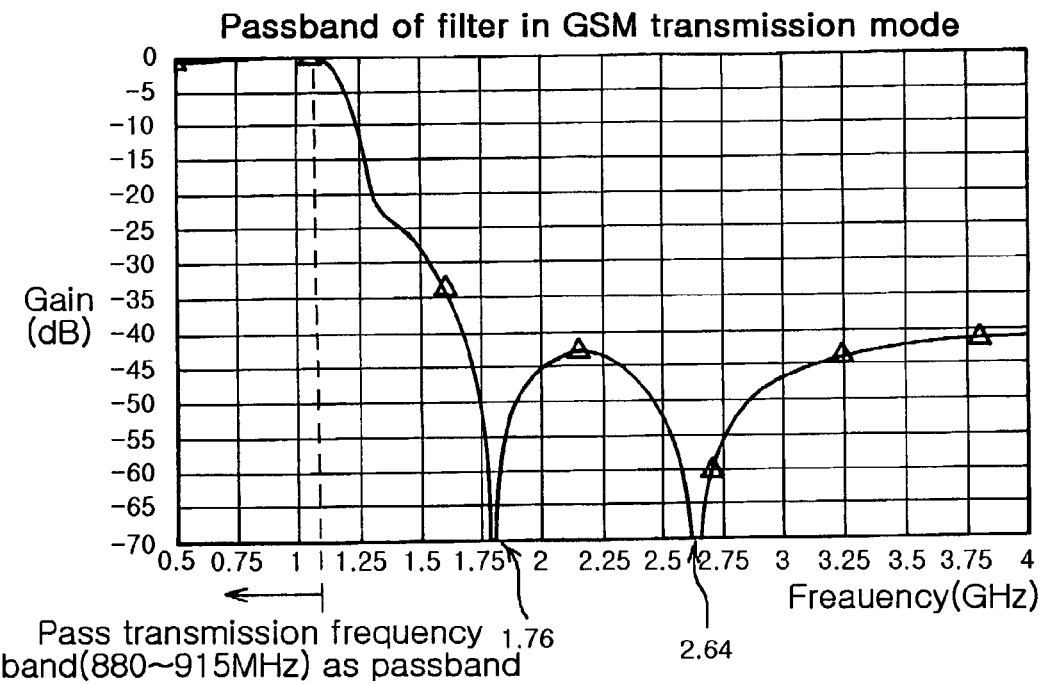
FIGS. 10a and 10b are graphs illustrating frequency characteristics of a GSM switching module.
Figure 10B:
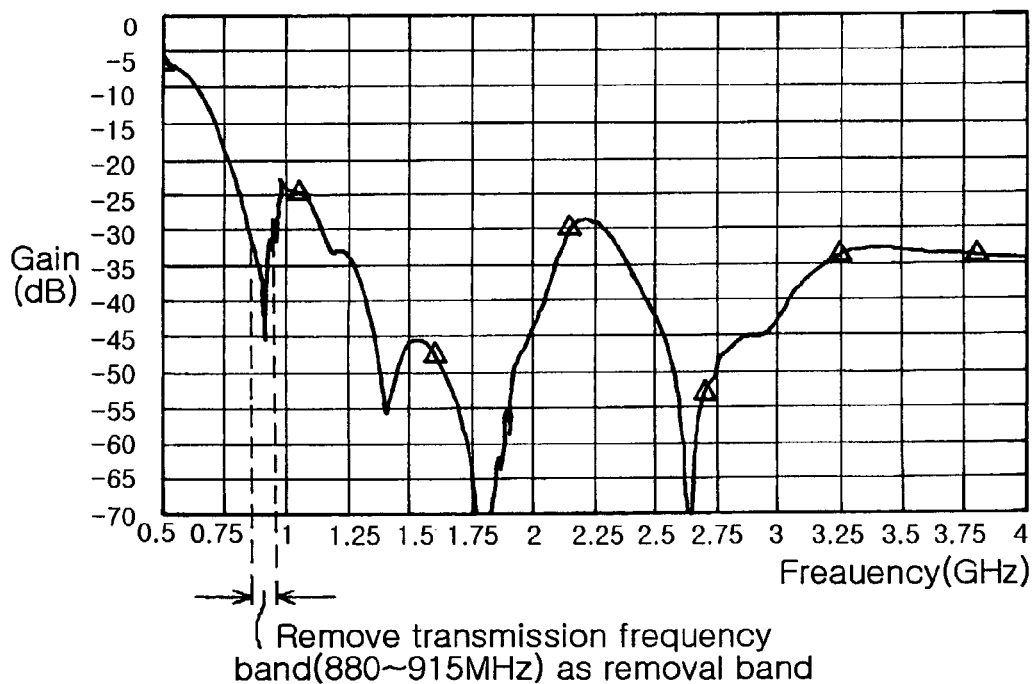
Figure 11A:
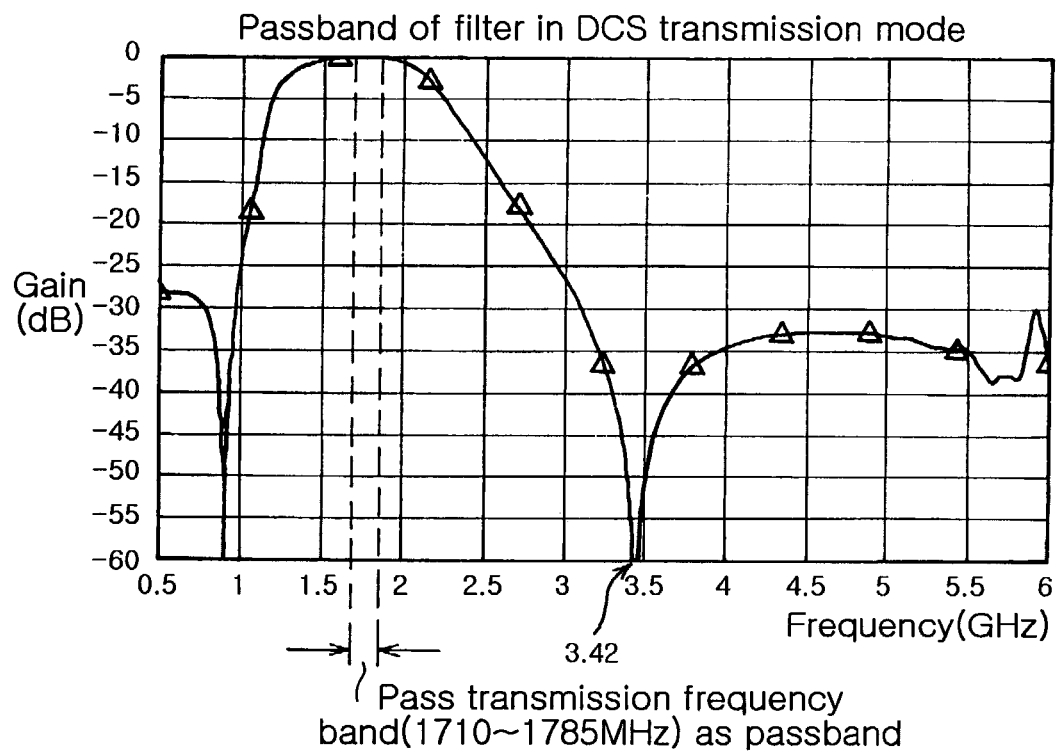
FIGS. 11a and 11b are graphs illustrating frequency characteristics of a DCS switching module.
Figure 11B:
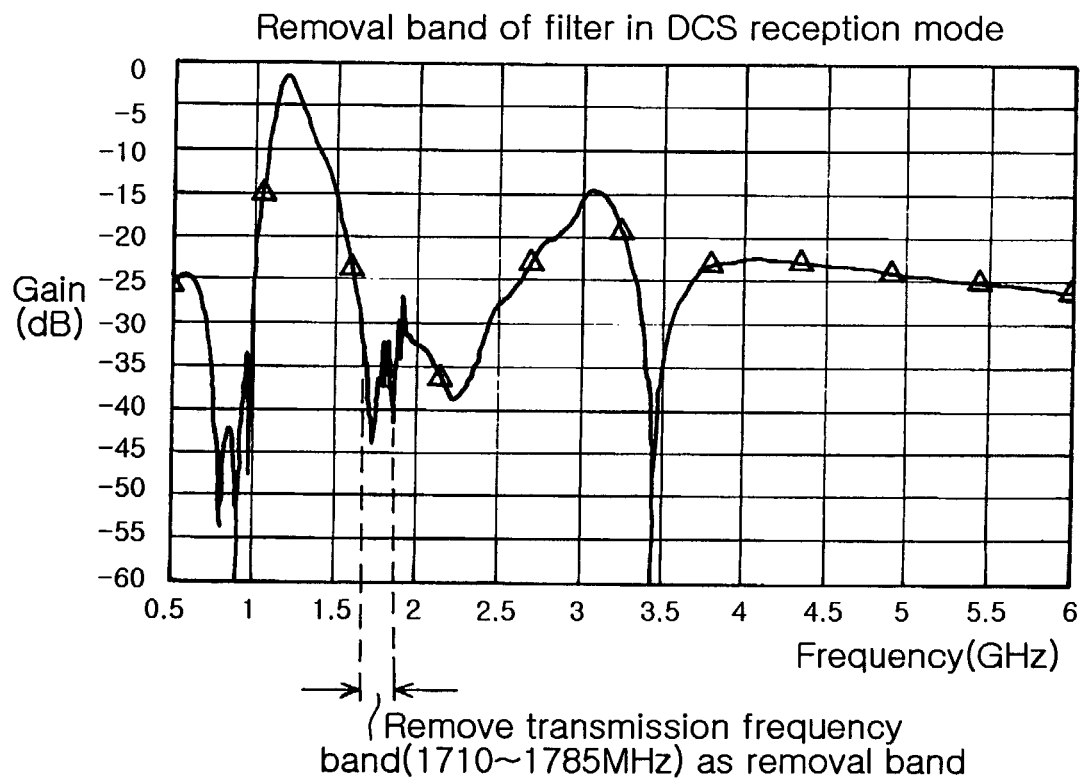

FIGS. 10a and 10b are graphs illustrating frequency characteristics of the GSM switching module SWM2 and FIGS. 11a and 11b are graphs illustrating frequency characteristics of the DCS switching module SWM3.

Now, the function and effect of the present invention will be described in detail in conjunction with FIGS. 3 to 11b.

First, a description will be given of the RF switching apparatus according to the present invention with reference to FIGS. 3 to 8.

Referring to FIG. 3, in the RF switching apparatus according to the present invention, the first switching device 32 and second switching device 33 are turned off in response to the switching signal Ssw in the transmit(Tx) mode (TX mode). The equivalent circuit of FIG. 3 in the transmit(Tx) mode is shown in FIG. 4a.

Referring to FIGS. 3 and 4a, since the first switching device 32 is turned off, a transmitted signal from the transmitter module TX is passed through the filter 31, which is preferably an LPF, and then provided to the antenna ANT. At this time, the antenna ANT and the receiver module RX are electrically isolated from each other by the turned-off second switching device 33, thereby preventing the transmitted signal from being introduced into the receiver module RX.

In the receive(Rx) mode (RX mode), the first switching device 32 and second switching device 33 are turned on in response to the switching signal Ssw. The equivalent circuit of FIG. 3 in the receive(Rx) mode is shown in FIG. 4b.

Referring to FIGS. 3 and 4b, the connection point of the filter 31 and transmitter module TX is grounded in the AC manner by the first switching device 32, thereby allowing the filter 31 to function as a substantially ¼ wavelength impedance transformer. That is, the filter 31 has an electrical length corresponding to about ¼ of the wavelength of a reception frequency. As a result, the filter 31 has a phase difference of about 90°, thereby causing the impedance between the filter 31 and the antenna ANT to be almost infinite. Consequently, the antenna ANT and the transmitter module TX are isolated from each other in the AC manner.

Meanwhile, the antenna ANT and the receiver module RX are connected with each other via the turned-on second switching device 33, so a received signal from the antenna ANT is provided to the receiver module RX via the second switching device 33.

The operation of a preferred embodiment of the filter 31 according to the present invention will hereinafter be described with reference to FIGS. 5a and 5b.

As shown in FIG. 5a, the filter 31 according to the present invention can be implemented with a "π"-type LPF which includes a plurality of capacitors C311, C312 and C313 set to 0.496 pF, 3.35 pF and 3.35 pF, respectively, and one inductor L311 set to 7.34 nH. In this case, the filter 31 has frequency characteristics with respect to GSM frequency bands (TX: 880–915 MHz and RX: 925–960 MHz), as shown in FIG. 5b.

In the frequency characteristic graph of FIG. 5b, the left ordinate axis represents a gain (dB), the right ordinate axis represents a phase (°) and the abscissa axis represents a frequency (GHz). In this frequency characteristic graph, a solid line G11 indicates a passband of the LPF in the transmit(Tx) mode (TX mode), from which it can be seen that the LPF passes the transmission frequency band (880–915 MHz) of the GSM mode with no loss in the transmit(Tx) mode. It can also be seen from the solid line G11 that an attenuation pole is formed at a third harmonic (3fo=2.64 GHz) of the transmission frequency (fo=880 MHz) to effectively cut off harmonic components thereof.

Also in the frequency characteristic graph of FIG. 5b, a dotted line G12 indicates phase differences-by-frequencies of the LPF in the receive(Rx) mode (RX mode). It can be seen from the dotted line G12 that the LPF has a phase difference of about 90° (indicated as '−89.34°' in FIG. 5b) with respect to the reception frequency band (925–960

MHz) of the GSM mode in the receive(Rx) mode. This signifies that the LPF functions as a ¼ wavelength impedance transformer in the receive(Rx) mode.

The operation of an alternative embodiment of the filter 31 according to the present invention will hereinafter be described with reference to FIGS. 6a and 6b.

As shown in FIG. 6a, the filter 31 according to the present invention can be implemented with a "π"-type LPF which includes a plurality of capacitors C311, C312 and C313 set to 0.657 pF, 1.7 pF and 1.7 pF, respectively, and one inductor L311 set to 3.243 nH. In this case, the filter 31 has frequency characteristics with respect to DCS frequency bands (TX: 1710–1785 MHz and RX: 1805–1880 MHz), as shown in FIG. 6b.

In the frequency characteristic graph of FIG. 6b, the left ordinate axis represents a gain (dB), the right ordinate axis represents a phase (°) and the abscissa axis represents a frequency (GHz). In this frequency characteristic graph, a solid line G21 indicates a passband of the LPF in the transmit(Tx) mode (TX mode), from which it can be seen that the LPF passes the transmission frequency band (1710–1785 MHz) of the DCS mode with no loss in the transmit(Tx) mode. It can also be seen from the solid line G21 that an attenuation pole is formed at a second harmonic ($2f_o$=3.42 GHz) of the transmission frequency ($f_o$=1710 MHz) to effectively cut off harmonic components thereof.

Also in the frequency characteristic graph of FIG. 6b, a dotted line G22 indicates phase differences-by-frequencies of the LPF in the receive(Rx) mode (RX mode). It can be seen from the dotted line G22 that the LPF has a phase difference of about 90° (indicated as '−91.96°' in FIG. 6b) with respect to the reception frequency band (1805–1880 MHz) of the DCS mode in the receive(Rx) mode. This signifies that the LPF functions as a ¼ wavelength impedance transformer in the receive(Rx) mode.

In the RF switching apparatus of the present invention as stated above, the first switching device 32 and second switching device 33 can be implemented with diodes, respectively, as shown in FIGS. 7 and 8.

Referring to FIG. 7, in the transmit(Tx) mode (TX mode), the first diode D71 and second diode D72 are both turned off in response to the switching signal Ssw because the voltage level of the switching signal Ssw is lower than a turn-on voltage level. In the receive(Rx) mode (RX mode), the first diode D71 and second diode D72 are both turned on in response to the switching signal Ssw because the voltage level of the switching signal Ssw is higher than or equal to the turn-on voltage level. The subsequent operations of the RF switching apparatus are the same as those previously described with reference to FIG. 3, and a detailed description thereof will thus be omitted.

Referring to FIG. 8, in the transmit(Tx) mode (TX mode), the first diode D81 and second diode D82 are both turned off in response to the switching signal Ssw because the voltage level of the switching signal Ssw is lower than a turn-on voltage level. In the receive(Rx) mode (RX mode), the first diode D81 and second diode D82 are both turned on in response to the switching signal Ssw because the voltage level of the switching signal Ssw is higher than or equal to the turn-on voltage level. The subsequent operations of the RF switching apparatus are the same as those previously described with reference to FIG. 3, and a detailed description thereof will thus be omitted.

Next, a description will be given of the mobile telecommunication terminal according to the present invention with reference to FIGS. 9 to 11b.

The mobile telecommunication terminal according to the present invention comprises the above-described RF switching apparatus according to the present invention. That is, the present mobile telecommunication terminal comprises, as shown in FIG. 9, the pre-switching module SWM1, GSM switching module SWM2 and DCS switching module SWM3, at least one of which can be implemented with the RF switching apparatus according to the present invention.

For example, in the case where the GSM switching module SWM2 and DCS switching module SWM3 in FIG. 9 are each implemented with the RF switching apparatus of the present invention, the GSM switching module SWM2 has frequency-gain characteristics as shown in FIGS. 10a and 10b and the DCS switching module SWM3 has frequency-gain characteristics as shown in FIGS. 11a and 11b.

It can be seen from FIG. 10a that the GSM switching module SWM2 in FIG. 9 passes the transmission frequency band (880–915 MHz) of the GSM mode with no loss in the transmit(Tx) mode. From this drawing, it can also be seen that attenuation poles are formed at second and third harmonics ($2f_o$=1.76 GHz and $3f_o$=2.64 GHz) of the transmission frequency ($f_o$=880 MHz) to effectively cut off harmonic components thereof.

It can be seen from FIG. 10b that the GSM switching module SWM2 in FIG. 9 efficiently removes the transmission frequency band (880–915 MHz) of the GSM mode in the receive(Rx) mode (RX mode).

On the other hand, it can be seen from FIG. 11a that the DCS switching module SWM3 in FIG. 9 passes the transmission frequency band (1710–1785 MHz) of the DCS mode with no loss in the transmit(Tx) mode. It can also be seen from FIG. 11a that an attenuation pole is formed at a second harmonic ($2f_o$=3.42 GHz) of the transmission frequency ($f_o$=1710 MHz) to effectively cut off harmonic components thereof.

It can be seen from FIG. 11b that the DCS switching module SWM3 in FIG. 9 efficiently removes the transmission frequency band (1710–1785 MHz) of the DCS mode in the receive(Rx) mode (RX mode).

Notably, the mobile telecommunication terminal according to the present invention is selectable from a group consisting of a mobile phone, a personal digital assistant (PDA), a vehicle-mounted telecommunication terminal, etc., and the RF switching apparatus according to the present invention can be made in the form of an RF switching module.

As apparent from the above description, the present invention provides an RF switching apparatus which is applied to a mobile telecommunication terminal such as a GSM terminal, a DCS terminal, a PCS terminal or etc. In the RF switching apparatus, a filter for a transmitter module passes a transmission frequency to an antenna in a transmit (Tx) mode and functions as a ¼ wavelength impedance transformer in a receive(Rx) mode to isolate the antenna and the transmitter module from each other in an AC manner. Therefore, no separate ¼ wavelength strip line is required while performances, such as a loss characteristic of a receiver module, an isolation characteristic of the transmitter module, etc., are satisfied, thereby making the circuitry of the switching apparatus simpler and, thus, the size thereof smaller.

In other words, the present RF switching apparatus requires no ¼ wavelength strip line, resulting in an advantage in miniaturizing the switching apparatus. Further, there is no need to add loss components of a ¼ wavelength strip line to characteristics of the receiver module, leading to an improvement in loss characteristic of the receiver module.

Although the transmitter module has conventionally been limitedly isolated by means of a series-connected diode, it can be isolated by means of the grounding in the present invention. Therefore, according to the present invention, the isolation characteristic of the transmitter module can be enhanced compared with the conventional one.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A radio frequency switching apparatus for controlling a connection between an antenna and a transmitter module and a connection between said antenna and a receiver module, said apparatus comprising:

filtering means connected between said transmitter module and said antenna for passing a transmitted signal from said transmitter module to said antenna in a transmit(Tx) mode, said filtering means having an electrical length corresponding to about ¼ of a wavelength of a reception frequency in a receive(Rx) mode;

first switching means connected between said filtering means and said transmitter module for connecting a connection point of said filtering means and transmitter module to a ground terminal in response to a switching signal in said receive(Rx) mode such that said filtering means is operated as an impedance transformer to isolate said transmitter module and said antenna from each other in an alternating current (AC) manner; and second switching means connected between said antenna and said receiver module for isolating said antenna and said receiver module from each other in response to said switching signal in said transmit(Tx) mode.

2. The radio frequency switching apparatus as set forth in claim 1, wherein said filtering means is adapted to, if said connection point of said filtering means and transmitter module is connected to said ground terminal by said first switching means in said receive(Rx) mode, be operated as an impedance transformer with a phase difference of about 90° to isolate said transmitter module and said antenna from each other in said AC manner.

3. The radio frequency switching apparatus as set forth in claim 1, wherein said filtering means is a low pass filter for passing low-frequency components of the transmitted signal from said transmitter module in said transmit(Tx) mode.

4. The radio frequency switching apparatus as set forth in claim 3, wherein said low pass filter has at least one attenuation pole formed at at least one harmonic of a transmission frequency in said transmit(Tx) mode.

5. The radio frequency switching apparatus as set forth in claim 1, wherein said first switching means includes a diode having its cathode connected to said connection point of said filtering means and transmitter module and its anode connected in common to said ground terminal and switching signal.

6. The radio frequency switching apparatus as set forth in claim 1, wherein said second switching means includes a diode having its anode connected to said antenna and its cathode connected to said receiver module.

7. The radio frequency switching apparatus as set forth in claim 1, wherein said first switching means includes a diode having its anode connected to said connection point of said filtering means and transmitter module and its cathode connected to said ground terminal.

8. The radio frequency switching apparatus as set forth in claim 1, wherein said second switching means includes a diode having its cathode connected to said antenna and its anode connected in common to said receiver module and switching signal.

9. A mobile telecommunication terminal comprising the radio frequency switching apparatus of claim 1.

* * * * *